Dec. 29, 1970 G. H. ERB 3,550,223
SEPARABLE FASTENING DEVICE AND METHOD OF MAKING SAME
Filed Dec. 22, 1967
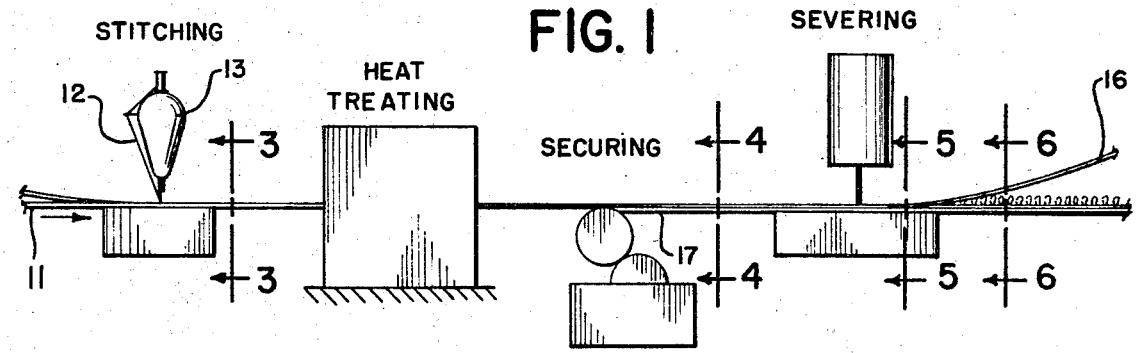
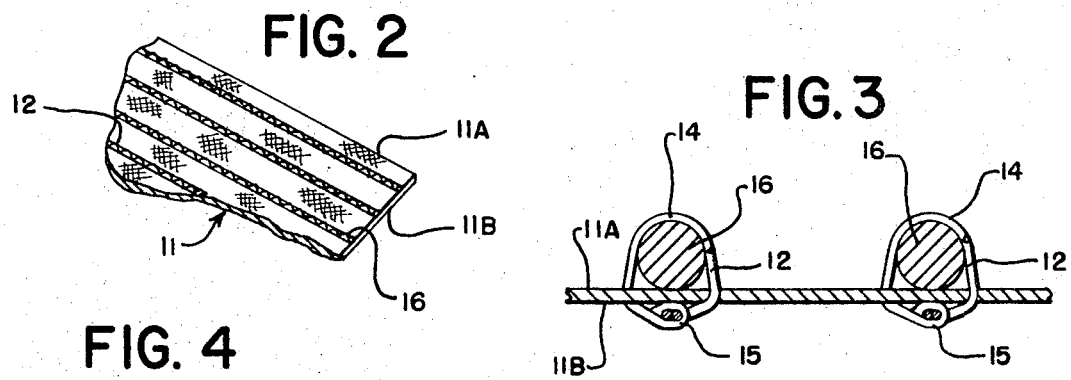
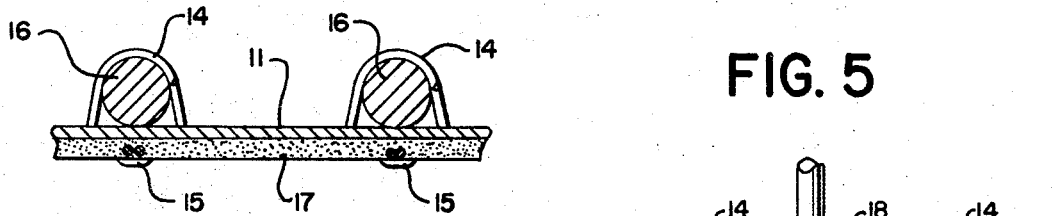
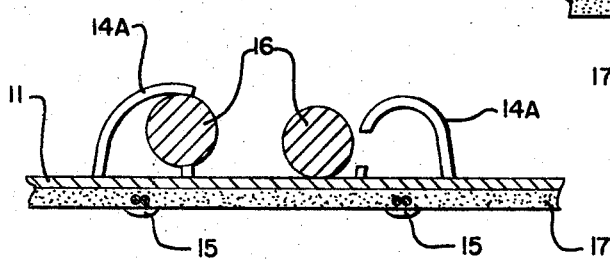
INVENTOR
GEORGE H. ERB
ATTORNEYS

United States Patent Office 3,550,223
Patented Dec. 29, 1970

3,550,223
SEPARABLE FASTENING DEVICE AND METHOD OF MAKING SAME
George H. Erb, Cuttingsville, Vt., assignor to American Velcro Corporation, Manchester, N.H., a corporation of New Hampshire
Filed Dec. 22, 1967, Ser. No. 692,931
Int. Cl. A44b 21/00; D05c 15/00
U.S. Cl. 24—204
23 Claims

ABSTRACT OF THE DISCLOSURE

A fastening device comprising two members each having an engaging surface provided with a very large number of hooking elements of the hook and loop type, the members being joinable by pressing the surfaces together, the joined members being resistant to separating forces generally parallel to the interface plane, and being readily separable by peeling forces applied substantially normal to the plane, and a method of making the device comprising the steps of stitching rows of threads into a base sheet, thereby forming the hooking elements into loops on the front surface of the sheet and under-stitches on the rear surface, maintaining the loops in a generally upright position, and securing the stitched threads to the rear surface, the hooks being formed by the further step of severing loops or removing a segment of the loop thread.

BACKGROUND OF THE INVENTION (1) Field of the invention

This invention relates to a separable fastening device of the type having two members, each provided with a very large number of resilient inter-engageable hooking elements some of which are hooks and the others loops. The invention also relates to a method of making these fastening devices, including the steps of stitching rows of threads into a base sheet to form the hooking elements thereon.

(2) Description of the prior art

U.S. Pats. Nos. 2,717,437, 3,083,737, and 3,154,837 disclose various forms of fastening devices of the type having hooking elements formed from flexible, resilient material into hooks and loops, which extend from the engaging surfaces of two joinable members. When these surfaces are pressed together in face-to-face relationship, a large number of the hooks engage a large number of the loops, the joined members being resistant to separation forces parallel to the interface plane, but being readily separable by peeling forces substantially normal to the plane.

The members of the fastening devices described above are made of threads integrally woven into a web or matrix with portions of certain threads extending from the web surface as rows of loops. The loops may be treated to set their shape and some treated loops are severed to produce rows of hooks with their associated stubbles. This severing converts the originally continuous thread into a series of unconnected hooking elements; however, these elements do not become loose or separated from the web, because of the initial integration into the web of root portions of the thread element remote from the hooking portions.

Prior art methods of manufacturing the devices described above require precision weaving machinery designed specifically for this product. The machinery must not only weave a base sheet, but also form and process the loops, and sever certain loops to form hooks. These devices have structure which is thus limited to material that can be economically woven and has suitable properties to produce resilient hooking elements.

SUMMARY OF THE INVENTION

Broadly stated, the invention relates to a separable fastening device and a method for its manufacture. The device is the type comprising two members each provided with an engaging surface having thereon a very large number of hooking elements, certain of which are hooks and the others loops. When these surfaces are pressed together a large number of the hooks and loops become inter-engaged, thereby resisting separation of the members by forces generally parallel to the interface plane of the surfaces. Each of the above members comprises a base sheet with at least one row of threads stitched into the sheet forming generally upright hooking elements on the front surface of the base and under-stitches on the rear surface. Each member also comprises means for securing the stitched threads to the rear surface, thereby stabilizing the hooking elements on the front surface. In a preferred embodiment of the invention the hooking elements on one member of the device are solely loops, the elements on the cooperating member are solely hooks, and the hooks are characterized as being sufficiently flexible and resilient to deflect and return to their original form after several cycles of repeated engagement and disengagement. The term "stitching" as used herein shall mean one complete movement of a threaded needle or comparable element through a sheet material such as a fabric thereby forming a single interlocked loop or portion of thread, as is done by sewing and certain other operations. In stitching, an independent thread is sewn into an existing sheet forming stitches, which become hook and loop hooking elements thereon. This stitching is in contrast to weaving wherein the body of the sheet material is formed simultaneously with the operations, and the hooking elements in the woven material comprise auxiliary warp threads which are an integral part of the sheet.

The method of making the separable fastening device described above comprises the steps of stitching rows of threads into each sheet member, thereby forming the hooking elements on the front engaging surface of the sheet and the under-stitches on the rear surface, maintaining the elements in a generally upright position, and securing the stitched threads to the rear surface. The hooking elements are first formed into loops which may be treated to set their shape, and finally severed to produce hook elements.

The cooperating members of the new separable fastener described above function similarly to members of certain prior art fasteners, but have an entirely new and different structure and mode of manufacture. According to this present invention the base sheets of the joinable members may be selected from any types of material made in different ways without limitation to being woven as in the prior art.

The method defined above is most appropriately practiced by using standard commercial or household type sewing machines, an example of which is the swing-needle type in contrast to weaving machines of the prior art methods. It is quite feasible to operate a single sewing machine with multiple needles or to operate multiple machines in tandem to produce any desirable tape width, and the operating speed and precision of these commercial machines is satisfactory for manufacturing a high quality product at a rapid rate. While a great variety of stitch patterns may be used to provide a corresponding variety of patterns of resulting hook elements on the base sheet, and it is particularly simple to select a desired pattern with a sewing machine, a preferred stitch is a single-thread lock stitch. An obvious advantage of this new method is that the hook tape product can be made with standard, existing machines and in lots of any size, with corresponding benefits in speed, economy and convenience.

BRIEF DESCRIPTION OF THE DRAWINGS

FIG. 1 is a schematic diagram showing the steps of the method of the present invention;

FIG. 2 is a fragmentary perspective view of the product after the method is partially completed;

FIG. 3 is a sectional view taken along line 3—3 of FIG. 1 showing the product after the stitching step;

FIG. 4 is a sectional view taken along line 4—4 of FIG. 1, showing the product after the securing step;

FIG. 5 is a sectional view taken along line 5—5 of FIG. 1 showing the loop-severing step;

FIG. 6 is a sectional view taken along line 6—6 of FIG. 1 showing removal of the supporting rod after the severing step; and FIG. 7 is a fragmentary sectional view of cooperating hook and pile elements formed by a method of this invention.

DESCRIPTION OF THE PREFERRED EMBODIMENTS

FIG. 1 is a schematic illustration of the preferred sequence of steps in the method of this invention, FIG. 2 shows a fragmentary portion of the product of this invention made by the above method, and FIGS. 3–6 show details of this product after various steps of the method. In summary the method comprises the following four steps shown in FIG. 1, although certain steps may be omitted for other embodiments. Sheet material 11 is moved from left to right, passing first under sewing machine 13 which stitches thread 12 into the sheet forming rows of upstanding loops 14. The stitched sheet is then heat-treated whereby the loops attain a set and will thereafter resiliently hold their shape. In the next step the portions 15 of the stitched threads on the bottom or rear surface of the sheet are secured thereto by receiving an adhesive coating 17; and finally certain loops are severed to become hooks 14A as seen in FIG. 7. These various steps will now be described in detail below.

FIG. 3 illustrates the basic features of the product wherein the base sheet's upper and lower or front and rear surfaces are designated 11A and 11B respectively, and thread 12 is stitched into sheet 11 with the bobbin or under-thread below the sheet not shown. Prior to the stitching step support elements in the form of elongate rods or wires 16 are disposed in spaced, parallel relationship upon front surface 11A as indicated in FIGS. 1, 2, and 3. With the wires 16 so disposed the machine 13 stitches thread 12 into the base 11 as spaced loops 14 about wire 16 along its length. As shown in the cross-sectional view of FIG. 3 the thread 12 is wrapped tightly around rod 16 and is interlocked below the sheet material in the understitch 15. In this particular case, support element 16 is round and defines a circular arc for the upper portion of loop 14; however, a variety of other support shapes could be used. The number and size of the loops depend merely on the number of support elements, their diameters, and the spacing of stitches by the machine. Clearly, a support must be provided to hold the loops upright during this loop formation step and during other steps. While the support rods 16 are quite satisfactory, certain alternative methods provide other features as will be discussed below.

For the heat treating step the rod 16 remains in its loop-supporting position, and tape 11 passes either through a heat chamber or adjacent a comparable heating source. In the embodiment shown, the thread is a nylon monofilament which when heated will obtain a permanent set in the position maintained during the heat treating process. This process thus renders the newly formed loops permanent and resilient as concerns the loop shape, but the process cannot be relied upon to rigidly secure the loops to the base material in which they are merely sewn.

The next step in this method comprises the application of an adhesive coating 17 to the rear surface 11B of the base material and to the under-stitched thread 15 exposed at this surface, to thus secure these threads in place. This adhesive may be a coating applied by rollers as shown in FIG. 1 or may be any other suitable material so long as under-stitches 15 are so bound to sheet 11 that loops 14 will neither descend nor fall sideways. As an alternative to a coating, a pressure-sensitive adhesive tape is applied to surface 11B for stabilizing the threads 15 with respect to the base sheet. It is preferred, however, that a coating be used which is shown in cross-section in FIG. 4 wherein substantially all of the thread material below the base sheet is encased in this adhesive 17.

The last step in forming the hook elements comprises the severing of each loop on one side thereof near its connection to the base sheet. As shown in FIG. 5 a tape is moved past a rotary cutting element 18 where it either slices through the exposed portion of thread or cuts a segment out of a portion of the thread. In both cases the element 16 remains within the loops prior to and during the cutting operation for porviding stability to the loops and base material during this operation, and thus assisting element 18 in cutting efficiently. After the cutting step, elements 16 are easily removed from the loops by being moved lateral as shown in FIG. 6 or by being moved axally where that is more convenient. As this figure illustrates, the thread material is sufficiently flexible and resilient for the support elements 16 to be easily removed without damage to the resulting hooks. In the case where a segment is removed from each loop, the remaining longer leg obviously has a hook shape and is ready for use. Where the loops are severed, the result will still be a suitable hook, because the two remaining portions of the loop will spring away slightly from each other.

As indicated earlier, support for the loops during the various steps is important and sometimes essential. When rod 16 is used, it comprises a single support means used throughout the course of the process; however, different means could be used during the different steps, or a different single means could be used in place of rod 16. One such suitable substitute is a generally flat web having spaced, generally parallel ribs. The web is preferably made of soft lead and is placed upon the top surface of the base sheet. A sewing machine stitches thread through both the web and the base sheet, forming loops about the ridges which then substitute for wires 16 and support the loops during the remaining steps. Finally, after the loops have been severed, the lead web is simply lifted away from the base; as the base and web are separated the hooks and stubbles straighten temporarily and are drawn through holes in the web made during the original formation of the loops.

Another alternative method of supporting the loops during any or all of the manufacturing steps involves the temporary placement of support elements adjacent the edges of the loops during the steps. The elements could be rotary members, bar members or any other suitable means of applying supportive pressure to maintain the loops in a gnerally rigid, upright position.

FIG. 7 illustrates a segment of hook-covered tape 19 produced by the method of the present invention and a cooperating segment of pile-covered tape 20. As described more fully in the patents referred to above, hook and pile tapes are joinable by slight pressure contact of the hooks 21 with the pile loops 22, and are readily separable by peeling them apart, thereby applying force generally normal to the interface plane of the engaging surfaces.

The loops 22 of member 20 are quite similar or identical to the loops of member 19 as they exist prior to the severing step wherein they become hooks 21. Preferably, however, the pile loops 22 are made of a finer gauge thread, are considerably more numerous, and are oriented randomly such that the hooks 19 will engage loops 22 regardless of the relative positions of members 19 and 20. Sewing with a multifilament thread and thereafter brushing the pile to separate the individual filaments will produce the numerous loops desired.

The method of making hook elements according to the teaching of this invention is equally practical for making pile loop elements 22 secured to a base sheet 23 for functioning as fastener member 20. The steps of the process for making this pile tape and the hook tape are essentially the same, except for the obvious omission of the severing step with respect to the pile loops. In certain cases it is preferable to also omit the heat-treating step, where there is no requirement for the loops to have a set shape, and the soft pile characteristics of a multiplicity of loops is fully satisfactory for the hook engaging operation. Because it is desirable that the density of loops in pile member 20 be considerably greater than the density of hooks in hook member 19, the initial sitching step on member 20 is adjusted to provide a greater number of stitches in more closely packed rows.

Another embodiment of the method described above is particularly well-suited for making pile or loop covered fastener members. Instead of loop-supporting wires 16 made of metal for example, water-soluble wires of polyvinyl-alcohol are used and heat resistant nylon monofilament thread is stitched to form the hooking elements. After heat setting the loops and securing them to the base sheet with adhesive, the wires are merely dissolved in water, leaving the fully formed upright loops. This eliminates the necessity of mechanically removing wires from within the heat-set loops, which removal might be difficult, besides being more costly.

The preferred embodiment of the product disclosed and claimed herein comprises sheet material 11 having a large number of hooks 14A or loops 14 extendinng generally upright from its front surface. The loops are portions of threads stitched by a sewing machine into the sheet in the form of a single thread lock-stitch, with under-threads 15 on the rear of the sheet 11B and polyurethane adhesive coating covering these threads to secure and stabilize them. The resultant loops will be distributed on the sheet in a pattern determined by the sewing machine and its operator.

What is claimed is:

1. A separable fastening device of the type having two members each provided with an engaging surface having thereon a very large number of hooking elements, certain of the elements being hooks and the others loops, a large number of the hooks and loops becming inter-engaged when said surfaces are pressed together thereby resisting separation of the members by forces generally parallel to the interface plane of the surfaces, each member comprising:
   (a) a base sheet;
   (b) at least one row of threads stitched into the base and formed into said hooking elements which extend generally upright on a front surface of the base and under-stitches on the rear surface; and
   (c) means on the rear surface securing said stitched threads thereto, thereby stabilizing the elements on the front surface.

2. A separable fastener as defined in claim 1, wherein all the hooking elements on one of the members are hooks, and all the hooking elements on the other member are loops.

3. A separable fastener as defined in claim 1, wherein said securing means is an adhesive coating.

4. A separable fastener as defined in claim 1, wherein said securing means is an adhesive tape.

5. A separable fastener as defined in claim 1, wherein said thread is stitched in a single thread lock-stitch.

6. A separable fastener as defined in claim 1, wherein said stitched threads are treated and thereby set to maintain the hooking elements and under-stitches in their stitched positions.

7. A separable fastener as defined in claim 6, wherein said thread comprises nylon monofilament which is heat-treated to obtain said set.

8. A separable fastener as defined in claim 7, wherein said securing means is a heat-resistant adhesive coating.

9. A hook member for use in separable fastening device of the type having two members each provided with an engaging surface having thereon a very large number of hooking elements, certain of the elements being hooks and the others loops, a large number of the hooks and loops becoming inter-engaged when said surfaces are pressed together thereby resisting separation of the members by forces generally parallel to the interface plane of the surfaces, said hook member comprising:
   (a) a base sheet;
   (b) at least one row of threads stitched into the base and formed into hook elements extending generally upright on a front surface of the base and under-stitches on the rear surface; and
   (c) means on the rear surface securing said stitched threads thereto, thereby stabilizing the hook elements on the front surface; and
   (d) said hooks being sufficiently flexible and resilient to deflect and return to their original form after several cycles of repeated engagement and disengagement.

10. A method for making complementary members for use as a separable fastening device of the type having two complementary sheet members each provided with an engaging surface having thereon a very large number of hooking elements, certain of the elements being hooks and the others loops, a large number of the hooks and loops becoming inter-engaged when said surfaces are pressed together thereby resisting separation of the members by forces generally parallel to the interface plane of the surfaces, comprising the steps:
   (a) stitching rows of threads into a sheet member;
   (b) forming loops from said stitched threads on a front surface of said sheet member during stitching and under-stitches on the opposite rear surface;
   (c) maintaining said loops in a generally upright position with respect to the sheet and forming the loops into said hooking elements to define a front engaging surface of the sheet; and
   (d) securing said stitched threads to said rear surface, thereby stabilizing the elements on the front surface.

11. A method as defined in claim 10 comprising the further step of treating said threads to set and maintain the shape and position of said hooking elements and stitches.

12. A method as defined in claim 10 comprising the further steps:
   (a) placing at least one elongate support member on the front surface prior to stitching,
   (b) stitching the threads in axially-spaced loops about said member,
   (c) treating said threads to set their stitched shape and position,
   (d) securing said threads in this supported position by applying an adhesive coating to the rear surface of the base,
   (e) severing said loops to form said hooks, and
   (f) removing said support member.

13. A method as defined in claim 10, wherein said hooking elements and under-stitches are portions of a lock stitch formed by a sewing machine of the type generally used for joining cloth.

14. A method as defined in claim 10, wherein securing said stitches comprises applying an adhesive coating to said rear surface and to under-stitches thereon.

15. A method as defined in claim 10 comprising the further step, after securing said loop hooking elements, of severing the loops to form said hooks.

16. A method as defined in claim 15, wherein severing comprises moving a rotary cutting means adjacent said loops and cutting through the threads thereof.

17. A method as defined in claim 15, wherein severing comprises removing a segment of thread from each loop.

18. A method as defined in claim 10 comprising the further step of supporting said loops during said stitching and securing steps.

19. A method as defined in claim 18, wherein supporting said loops comprises disposing at least one removable elongate member on the front surface, the threads being stitched about the member, and subsequently removing the member.

20. A method as defined in claim 19, wherein the elongate member is soluble material and the threads are stitched into the base, forming axially-spaced loops about said member which thereby support said loops, the method comprising the further step of dissolving said member.

21. A method as defined in claim 20, wherein said threads are nylon monofilament and said elongate member is soluble in water.

22. A method as defined in claim 21, further comprising the step of heat-treating said nylon loops to set their shape and position before they are secured to the base.

23. A method as defined in claim 18, wherein supporting said loops comprises disposing on said front surface a web having spaced ribs about which said loops are stitched, severing the loops while thus supported, and removing said web.

References Cited

UNITED STATES PATENTS

| | | | |
|---|---|---|---|
| 2,048,413 | 7/1936 | Spesso | 24—204UX |
| 2,448,928 | 9/1948 | Stahl | 161—52 |
| 2,717,437 | 9/1955 | Mestral | 28—72 |
| 3,359,934 | 12/1967 | Schwartz et al. | 161—65X |
| 3,402,094 | 9/1968 | Levitch | 161—50X |

DONALD A. GRIFFIN, Primary Examiner

U.S. Cl. X.R.

28—72